United States Patent [19]

Anger

[11] Patent Number: 4,787,728
[45] Date of Patent: Nov. 29, 1988

[54] TEMPLE FOR A SPECTACLE FRAME

[76] Inventor: Wilhelm Anger, Chesa Pas-Cjira, 7500 St. Moritz-Suvretta, Switzerland

[21] Appl. No.: 88,867

[22] Filed: Aug. 24, 1987

[30] Foreign Application Priority Data

Jan. 15, 1987 [DE] Fed. Rep. of Germany ....... 3701034

[51] Int. Cl.⁴ .............................................. G02C 5/20
[52] U.S. Cl. .................................... 351/118; 351/119
[58] Field of Search ................ 351/111, 118, 119, 117

[56] References Cited

U.S. PATENT DOCUMENTS 1,138,012  5/1915  Perkins ................................. 351/118
1,751,804  3/1930  Fischer ................................. 351/118

FOREIGN PATENT DOCUMENTS 1295891  7/1961  France .
58-75957  3/1985  Japan .
137250  1/1929  Switzerland .
312111  2/1928  United Kingdom .
336231  7/1929  United Kingdom .

Primary Examiner—Rodney B. Bovernick
Assistant Examiner—P. M. Dzierzynski
Attorney, Agent, or Firm—Roth & Goldman

[57] ABSTRACT

A temple for a spectacle frame has a plug connection between the shaft of the temple and temple end piece first made separately from the shaft of the temple. The plug connection is comprised of a borehole in one of the two elements and a plug on the other of the two elements, which plug is inserted into the borehole, as well as a fixing mechanism for ensuring the relative position between the temple end piece and the shaft. The fixing mechanism has a clamping element, which can assume various axial positions with respect to the peripheral wall surrounding the borehole and which, depending on its axial position, more or less sharply compresses the peripheral wall radially and through this means clamps the plug firmly in the borehole. This design of the fixing mechanism facilitates an exact setting of the length of the temple and of the inner inclination of the temple in adapting it to the geometry of the head of the individual spectacle wearer.

16 Claims, 2 Drawing Sheets

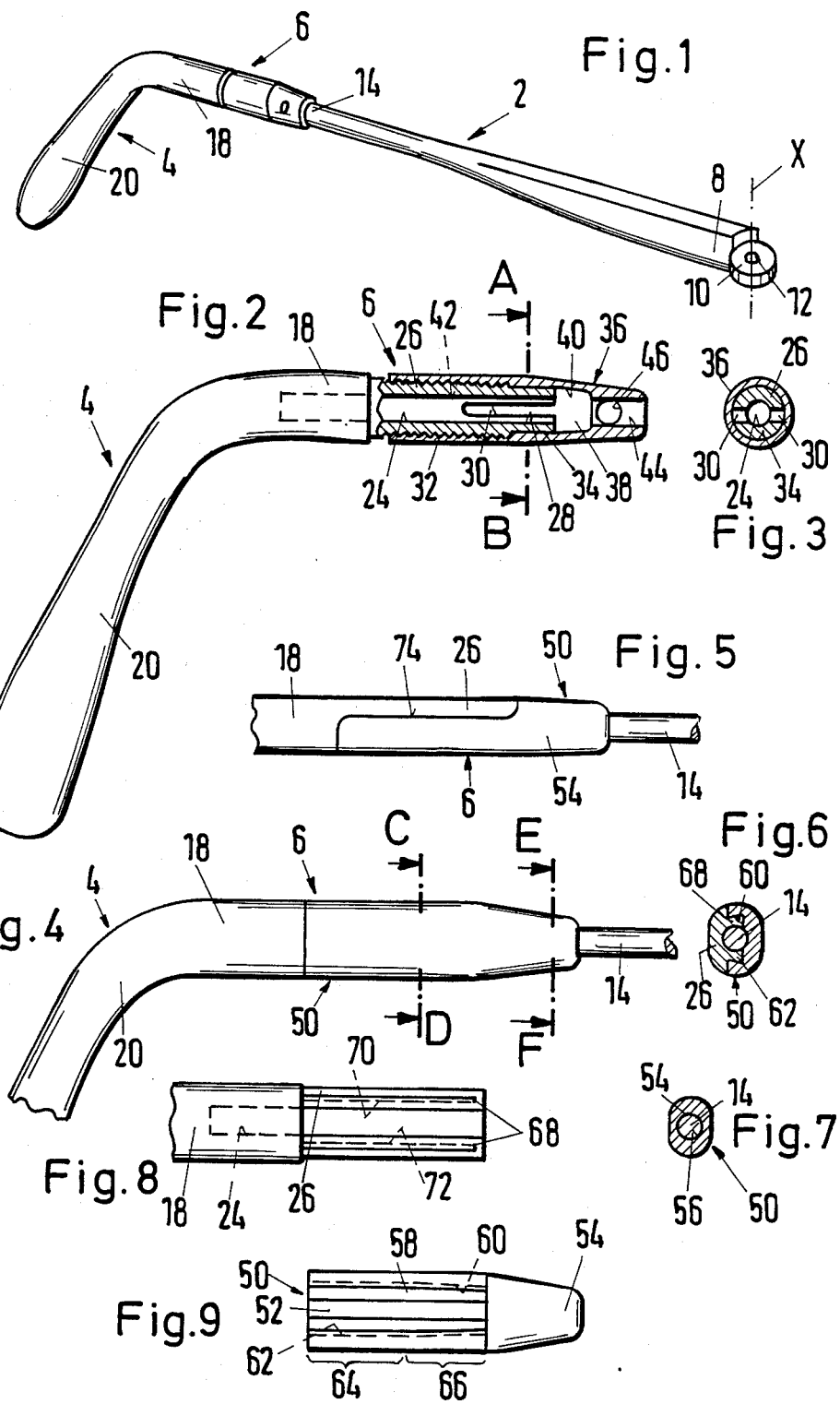

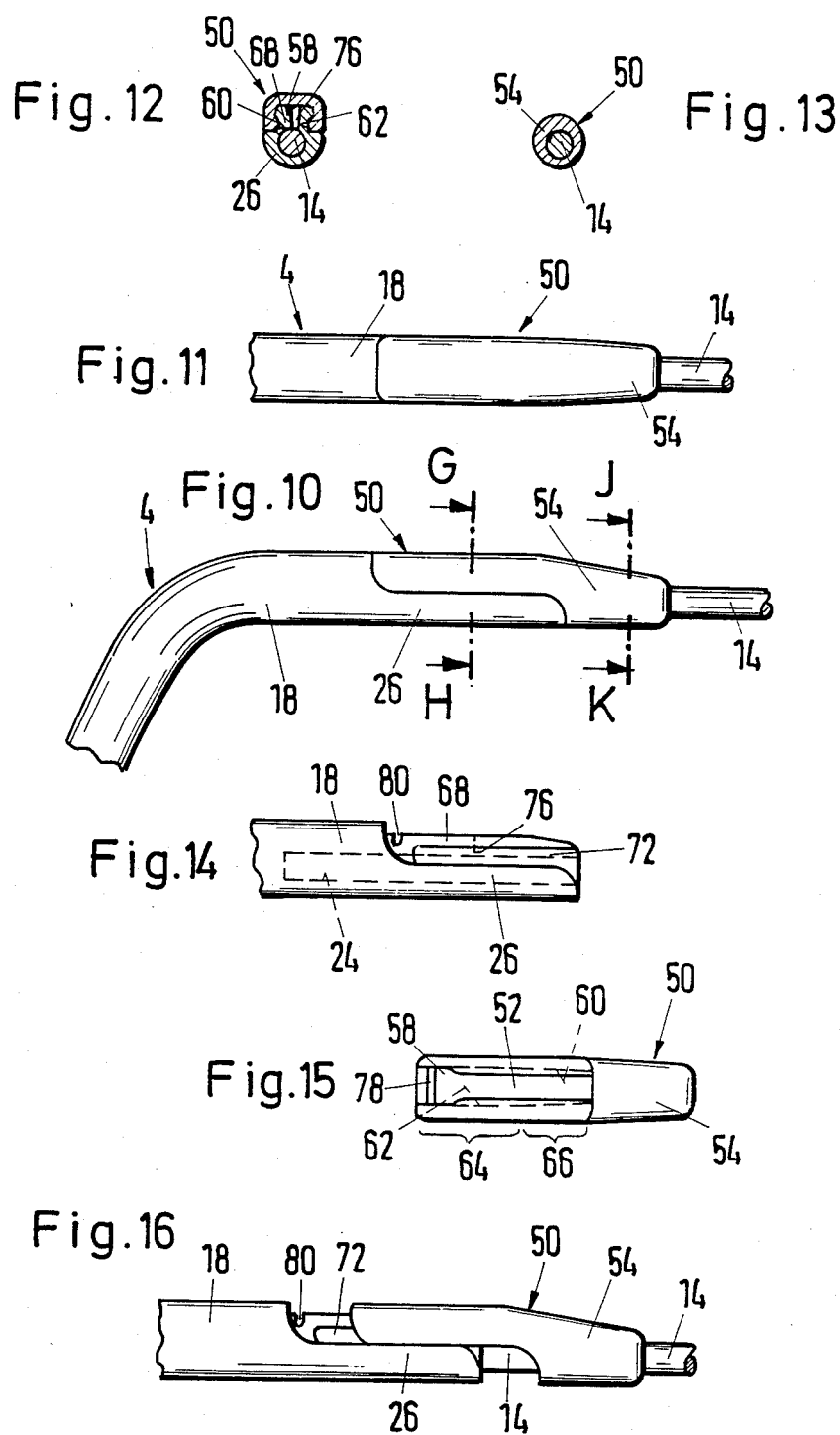

TEMPLE FOR A SPECTACLE FRAME

FIELD OF THE INVENTION

The present invention relates to a temple for a spectacle frame with a longitudinal, essentially straight shaft, which can be joined at its initial, shaft end with a wedge grip or connecting piece of the spectacle frame by means of a hinge joint and having a temple end piece which manifests a longitudinal, essentially straight first segment extending in the prolongation of the shaft and a longitudinal second segment connecting to the first segment, which second segment extends away from and downward from the first segment to include an angle of less than 180°.

PRIOR ART AND ITS CRITICISMS

Such a temple is basically known in the art. The second segment of the temple end piece has the function of either itself coming to rest behind the ear on the skull of the spectacle wearer or of supporting a segment of the temple end piece, which segment reposes on the skull and/or on the ear of the spectacle wearer. In any event by virtue of this reposing of the second segment or of the additional segment it supports provision is made for the temple, together with a similar second temple on the other side of the head and together with part of the bridge, holds the spectacle frame dependably on the head of the spectacle wearer and supports it there. The temple can all the more readily fulfill this task, the better it is adapted to the individual geometry of the spectacle wearer's ear or head. As part of the geometry of the head also belongs the inner inclination of the contact area on the head and/or on the ear, which area should follow the inner inclination of the second segment of the temple end piece. Conventional temples of the type known in the art, however, are basically formed in one piece and with one and the same inner inclination, whereby the attempt is made if need be to produce a suitable inner inclination of the temple end piece or second segment by a plastic deformation conducted by, for example, the fitting optician. This adaptation is made at the same time the length of the temple is adapted. Since in this instance it involves a process of trying on, the result is often inadequate, thus causing relatively poor comfort in wearing the spectacles.

A temple with the characteristics of the introductory clause of Patent Claim 1 will belong by virtue of German Patent Application P 36 04 358.3 to the state of the art. This temple known in the art has a plug connection between the temple shaft and the temple end piece, which connection makes it possible to provide for a suitable length of the temple by cutting the temple shaft to length before joining it with the temple end piece. In addition, the plug connection is equipped with a fixing device, consisting essentially of bridges or bands extending in the axial direction of the borehole and protruding from the surface of the plug or the borehole and which interlock with the surface of the other element respectively (borehole or plug). The surface of the element (borehole or plug) not equipped with bridges or bands is essentially cylindrical in form. By virtue of this cylindrical formation of the one surface provision is made for it to be possible to insert the plug into the borehole at any angle desired to the temple end piece relative to the shaft, so as in this manner to set a prescribed or desired inner inclination of the temple end piece. After this has been accomplished, the plug will be inserted deeper into the borehole, so as to cause the bands to engage with the surface lying opposite, through which means the previously set inner inclination is fixed in place. This design is especially suited in cases in which it is possible to predetermine the length of the temple and the inner inclination; however, it is less well-suited for instances in which the requisite inner inclination is not intended to be found until the temple is adapted to the head of the spectacle wearer, because in the instance of this temple known in the art, at the time at which the inner inclination is set the temple still is possessed of an excessive length and in consequence of this it is not possible during the fitting process to try on the spectacles while simultaneously setting the length of the temple and the inner inclination of the temple end piece.

OBJECT OF THE INVENTION

The present invention is based on the objective of designing a temple of this genre in such a manner that it will be possible to set its length and the inner inclination of its temple end piece in infinitely variable fashion, whereby these settings should already be attainable before they are fixed in place, so that it will be possible to change the settings repeatedly in adjusting the temple to fit before it is possible to fix it in place. In addition, the temple to be fashioned should guarantee that the temple end piece will already be so sitting firmly on the temple shaft during the fitting process and prior to fixing in place that it will still be possible to make one further change of their relative positions, but that they are already connected to one another in such a manner that a prior set relative position will not change in or of itself while the spectacle frame is being tried on or while it is being manipulated, especially when the spectacle frames are being removed.

SUMMARY AND ADVANTAGES OF THE INVENTION

This objective is achieved in accordance with the present invention by means of the temple in accordance with Patent Claim 1, i.e., essentially by virtue of the fact that fixing is place is accomplished by means of a clamping element, which can be brought into various axial relative positions with respect to the peripheral wall of the borehole and through this means provides for static friction of various intensity between the surfaces of plug and borehole. This clamping element thus clamps the peripheral wall of the borehole more or less firmly down on the plug. This makes it possible to set a suitable static friction between plug and peripheral wall during the fitting process in such a manner that the relative positions between temple end piece and shaft can still be altered without any great expenditure of force, but while allowing for the respective preset relative positions to be retained to an adequate degree, and that after the occurrence of the desired relative position the static friction will be increased to such an extent that the temple end piece and the shaft will be permanently connected to one another and fixed in place. For this the final fixing in place requires no relative movement between temple end piece and shaft, but solely a relative movement between the clamping element and the peripheral wall. Through the latter mentioned relative movement, however, neither the length of the temple nor the inner inclination of the temple end piece will be changed.

In a preferred embodiment of the present invention provision can be made for both the surface of the plug and the surface of the borehole to be shaped cylindrically over the entire length of the interlocking between borehole and plug and further more to be roughened so as to achieve a large contact area and strong static friction between plug and borehole. Alternatively, however, the static friction between borehole and plug, i.e., the frictional connection between these two elements, can be enhanced by means of form-locking, which can be produced by having the plug to manifest protrusions in its longitudinal direction jutting out radially which press into the surface of the borehole in the position of the clamping element corresponding to maximum compression of the peripheral wall.

In addition, in a further embodiment of the present invention provision can be made for the surface of the borehole and/or the plug to be coated with can adhesive which is liberated by pressure. This will cause an especially strong connection between the temple end piece and the plug at the time of the final fixing in place, without sacrificing the possibility of achieving an adequately high static friction between plug and borehole during the fitting process. Such an adhesive, which would cause an undissolvable connection, will not be brought into use, however, if the connection between temple end piece and shaft is intended so be dissolvable. A dissolvable connection will be especially of advantage should it be intended to be possible to alter the length of the temple and/or the inner inclination of the temple end piece once again after the spectacle frame has been worn for a period of time.

In a further embodiment of the present invention provision can be made for the clamping element to be a collar, which is screwed on to the outer side of the peripheral wall or the plug and which presses with a conically tapering end segment against a contact surface on the free end of the peripheral wall and by this means provides the frictional locking between borehole and plug. Alternatively to this, the clamping element can be formed in the shape of a sliding element equipped with a longitudinal groove that interlocks with a complementarily shaped protrusions in the peripheral wall in such a manner that the two flanks of the groove compress the flanks of the protrusion and through this means force the peripheral wall onto the plug and cause the frictional locking between borehole and plug.

Additional embodiments of the present invention are indicated in the subsidiary claims and may be seen in the following description of embodiments of the present invention.

Embodiments of the present invention are depicted in the drawings and are described more closely below. The drawings illustrate the following:

FIG. 1 a view in perspective of a temple in accordance with the preferred embodiment of the invention;

FIG. 2 a lateral view, partially in section, of the temple end pieced of the temple according to FIG. 1, whereby, however, the plug of a plug connection is not depicted;

FIG. 3 a sectional depiction in accordance along A-B in FIG. 2;

FIG. 4 a lateral view in cutaway section of a temple end piece in accordance with a second embodiment of the temple in accordance with the present invention in a representation similar to FIG. 2;

FIG. 5 a top view of FIG. 4;

FIG. 6 a sectional representation along C-D in FIG. 4;

FIG. 7 a sectional representation along E-F in FIG. 4;

FIG. 8 a view of the first segment of the temple end piece in accordance with FIG. 4;

FIG. 9 a view of a sliding element of the second embodiment as seen from the left in FIG. 6;

FIG. 10 a lateral view in cutaway section of a temple end piece of a third embodiment of the present invention in a representation similar to FIG. 2;

FIG. 11 a top view of FIG. 10;

FIG. 12 a sectional illustration along F-H in FIG. 10;

FIG. 13 a sectional illustration along J-K in FIG. 10;

FIG. 14 a lateral view of the first segment of the temple end piece of the third embodiment;

FIG. 15 a view of a sliding element of the third embodiment from below; and

FIG. 16 an illustration corresponding to FIG. 10, but with the sliding element assuming an intermediate position, in which the plug connection between the temple end piece and the shaft end has not yet been completely fixed in place.

The temple in accordance with FIG. 1 is comprised of a longitudinal, essentially straight shaft 2 and a temple end piece 4, which is first made separately from the temple shaft 2 and then is permanently connected with the shaft 2 by means of a plug connection 6.

The shaft 2 has an initial shaft end 8, on which an eye 10 is formed, which together with additional elements (not shown) can form a hinge joint, by means of which the temple can be connected to a spectacle frame with a wedge grip (not shown) or a connecting piece (not shown). The course of a hinge axis X is determined by the eye 10 and a hinge borehole 12 formed in this.

The second shaft on the left as seen in FIG. 1 forms a plug 14, which has a cylindrical surfaces and thus a circular profile along its entire length. Outside the plug connection 6, the profile of the shaft 2 gradually changes in the direction toward the first shaft end into the profile recognizable in FIG. 1 in the form of a rounded-off square. As may be seen in FIGS. 1 and 2, the temple end piece 4 is comprised of a longitudinal, essentially straight first segment 18, which gradually transforms at its back end on the left as seen in FIG. 1 into a curved longitudinal second segment 20 extending sharply downward. The first segment 18 and the second segment 20 are formed together in one piece, whereby the second segment 20 has the function of resting against the ear and/or the skull of the spectacle wearer with ideally no disturbing pressure points at all. The temple end piece 4 can be made of a plastic, preferably of a polyetherimide. The shaft 2 can also be made of plastic, preferably polytherimide; but it can also be made of metal.

The entire shaft 2 and the first segment 18 of the temple end piece 4 as well will be -- if observed from above -- somewhat curved, so that the temple will cause a contact area with the spectacles worn in place between the temple end piece and the skull and/or ear of the spectacle wearer, without the shaft 2 itself coming into contact with the head of the spectacle wearer and without the first segment 18 exercising any disturbing lateral pressure on the skull. In addition, the temple end piece 4 manifests an inner inclination. This means that the second segment 20 is not situated essentially in a plane defined by the hinge axis X and the longitudinal axis of the shaft, but is shifted with its lower end out of this plane, specifically in the direction toward the head (not shown) of the spectacle wearer. This inner inclination is adjustable in infinitely variable fashion, owing to the special design of the plug connection 6 and through this means can be adapted to the individual shape of the skull of the spectacle wearer. In addition to this, the special design of the plug connection 6, makes it possible to set the length of the temple, i.e., the distance between the hinge axis X and the second segment 20 of the temple end piece 4, in infinitely variable fashion and to adapt to the individual geometry of the head of the spectacle wearer.

In the following the plug connection 6 between the temple end piece 4 and the shaft 2 in accordance with the present invention will be described in closer detail with especial reference to FIGS. 2 and 3.

In the first segment 18 of the temple end piece 4 a borehole 24 with a cylindrical surfaces is formed extending in the longitudinal direction of the first segment. The borehole 24 is surrounded by a peripheral wall 26 and is open on the free end 28 as seen on the right in FIG. 2. On its end as seen on the left in FIG. 2 the borehole 24 is closed. The peripheral wall 26 is equipped with two longitudinal slots 30 extending in the direction of the borehole axis 24, which slots are situated opposite one another with respect to the borehole axis 24 and are open at the free end 28 of the peripheral wall.

On the outer side of the peripheral wall 26 an external thread is formed. This does not extend over the entire length of the peripheral wall 26, but transforms in the area of the free end 28 of the said wall into a smooth contact area 34 formed on the outer side of the peripheral wall 26, which area in the embodiment shown has a constant cylindrical diameter over its entire length. The edge between the contact area 34 and the front side of the peripheral wall 26 is rounded off at its free end 28.

The conically tapering end segment 40 of the collar borehole 38 and the contact area 34 on the free end 28 of the peripheral wall 26 are coordinated with one another in such a manner that the surface of the end segment 40 comes into contact with the contact surface 34 while the collar 36 is screwed onto the peripheral wall 26, specifically at a time at which the outer thread 32 and the inner thread on the end segment 42 are securely interlocked with one another, yet the collar 36 has not yet been completely screwed onto the peripheral wall 26. This has as its consequence the fact that when the collar 36 is screwed further onto the peripheral wall 26, the conically tapering end segment 40 will be slid further over the contact area 34 and by this means radially compresses the peripheral wall 26 in the area of the free end 28 and deforms it. In this process the extent of this radial compression will depend upon the axial position of the collar 36 relative to the peripheral wall 26.

To the right of this as seen in FIG. 1 a cylindrical borehole 44 with decreasing diameter connects onto the collar borehole 38, which is the same as the diameter of the borehole 24 in the first segment 18. In the area of the borehole 44 the collar 36 manifests a tool working surface in the form of a transverse borehole 46.

Before the temple end piece 4 and the shaft 2 to the temple are joined together, the shaft 2 is trimmed down to the requisite length, through which it can result that such a piece is cut off from the plug 14, that when the plug 14 is inserted into the borehole 24 as far as the base of said borehole 24, the temple will have the desired and requisite length. This can be accomplished by repeated tries, whereby the shaft 2 of the temple will not be brought to its requisite length until several steps have been taken. Alternatively, however, such a piece can also be cut off the temple, so that when the temple end piece 4 is correctly fitted to suit the individual spectacle wearer, the temple shaft 2 does not impinge on the base of the borehole 42. In the latter-mentioned instance it will be possible to adapt the temple end piece 4 on the shaft 2 through shifting in one or the other direction, without its being necessary to trim off the shaft 2 with each step of fitting.

Before the trimmed-off shaft 2 is inserted into the borehole 24, the collar 36 is screwed onto the peripheral wall 26, but only far enough for the peripheral wall 26 not yet to become essentially compressed at its free end 28. When the plug 14 formed by the second shaft end has been inserted into the borehole 24, the collar 36 is screwed onto the peripheral wall 26 far enough for the static friction between the surface of the borehole 24 and the surface of the plug, owing to the radial compression of the peripheral wall 26, is of such a nature that the plug 14 can still be shifted in the borehole 24 and that the temple end piece 4 can still be rotated around the axis of the borehole 24 relative to the plug 14, but the relative position between the temple end piece 4 and the plug 2 will not be altered because of any casual jarring of the elements of the temple or because of the weight of the elements of the temple in any change in position of the latter. In this state the shaft 2 and the temple end piece 4 are pre-fixed in place with one another. In this pre-fixed state the temple is adapted to the particular geometry of the spectacle wearer's head. This can be accomplished by shifting the temple end piece 4, with the spectacle frame equipped with the pre-fixed temple worn in place, on the plug 14 into such a position and around the plug axis until the temple can assumed the correct length and the temple end piece 4 the correct inner inclination. During the fitting process the length at any given time and the inner inclination is judged by the fitter and the spectacle wearer and, if need be, changed until an inner inclination of the temple end piece 4 felt to be correct and the length of temple are found. Alternative to the above-described procedure, however, indications concerning the correct inner inclination and correct length of temple can be obtained by taking measurements, for example, on the head of the spectacle wearer and applied to the pre-fixed temple.

After the temple length and the inner inclination of the temple end piece 4 has been set on the pre-fixed temple in the manner explained in the above, the collar 36 is screwed onto the peripheral wall 26 to a further extent than in the pre-fixed state, so that the peripheral wall 26 is radially compressed and deformed more forcefully in the region of its free end 28 by the conically tapering end segment 40 and through this means is pressed more forcefully again the plug 14 reposing in the borehole 24, so that the static friction between the plug 14 and the peripheral wall 26 will increase. In this process the collar 26 on the peripheral wall 26 will ultimately assume the position illustrated in FIGS. 1 and 2, in which the static friction is great enough for the relative alignment between the peripheral wall 26 and the first segment 18 of the temple end piece 4 on the one hand and the plug 14 and shaft of the temple 2 on the other can no longer be changed when such forces occur when the spectacle frame is put to its intended use. This means in other words that the temple end piece 4 and the shaft 2 are finally fixed in place relative to one another. The fixing mechanism provided for the purpose of fixing in place is comprised of the collar 36 and the radially compressible and deformable peripheral wall 26 with its free end 28, on which the contact area 34 is formed. For this purpose the collar 36 constitutes the clamping element, by means of which the plug 14 can be permanently clamped in the borehole 24. It will be of advantage in the above-described embodiment for the strength of the static friction between the peripheral wall 26 to be set in infinitely variable fashion by shifting the collar 36 in its axial direction on the peripheral wall 26. Any static friction or clamping proving during the fitting of the temple possibly to be too strong or too weak, changes can be made in the required direction. It will furthermore be of advantage that the formation of the plug connection as described and the fixing their mechanism will permit the relative position between the temple end piece 4 and the shaft 2 can be altered directly on the head of the spectacle wearer, i.e. and the temple end piece 4 to be pushed or pulled directly on the head along the shaft 2 into the correct position and to be assigned the correct inner inclination. It will not be necessary to remove the spectacle frame from the head of the spectacle wearer in order to change the relative position by manipulation on the temple, whereby the altered relative position can not be examined until the spectacle frame was once more set in place. Finally, it will be advantageous for the setting of the static friction or clamping force will not require or cause any change of the relative position between the temple end piece 4 and the shaft 2 until the final fixing in place, so that the relative position found to be correct or desirable in the prefixed state during the fitting process will coincide with the relative position after the final fixing in place.

In a variant of the above described embodiment, provision can be made for the borehole 44 to have an interior thread, which interlocks with the corresponding outer thread on the plug 14 and, instead of the outer thread 32 and the inner thread in the end segment 42 of the collar borehole 38, for each to be provided with smooth cylindrical surfaces. In addition, as a variant of the above described preferred embodiment provision can be made for the collar 36 not to be in thread interlocking with either the peripheral wall 26 or the the plug 14 or shaft 2 and in a design otherwise identical to the embodiment described to be capable of shifting on the peripheral wall 26 and the plug 14 in the longitudinal direction of the plug. In the latter-mentioned design, detent elements (not shown in FIGS. 1 through 3) will preferably be provided to work between the collar 36 and the peripheral wall 26, which elements will interlocking with one another when the collar assumes its axial position corresponding to the maximum compression of the peripheral wall 26, i.e., its position at the time of the final fixing in place.

A further embodiment of the present invention is illustrated in the FIG. 4 through 9. In conjunction with the second embodiment, the identical reference numerals will be used for elements identical or analagous to the preferred embodiment. These identical or analagous elements will not be explained anew. Rather, in the following only the differences of the second embodiment to the preferred embodiment will be described.

The clamping element of the fixing mechanism of the second embodiment is formed in the shaped of a sliding element 50, which is slid on to the peripheral wall 26 and interlocks with the latter. In the completely slid-on state of the sliding element 50 its surface transforms compactly into the surface of the first segment 18 and the peripheral wall 26, as shown in FIGS. 4, 5 and 6 and as provided for in the instance of the collar 36 and the first segment 18 of the preferred embodiment.

The sliding element 50 is shaped in the form of a longitudinal element, which has a longitudinal groove 52 extending in the longitudinal direction of the plug 14, which groove extends over the major part of the length of the sliding element 50, as shown especially in FIG. 9. In the segment of the sliding element 50 equipped with the longitudinal groove 52 a collar-shaped segment 54 (to the right as seen in FIG. 9) is attached, in which a borehole 56 has been shaped, which has the same diameter as the borehole 24 in the first segment 18 and which with the sliding element in place extends in the prolongation of the borehole 24, so that the plug 14 with the temple end piece 4 fixed in place on the shaft 2 extends both through the borehole 56 and the borehole 24, and in addition guides the sliding element 50 with any axial shifting. The outer surface of the segment 54 of the sliding element 50 is formed in tapering fashion, so that a gradual transition is accomplished from the segment 18 of the temple end piece 4 to the shaft 2.

The longitudinal groove 52 has a groove base 58 and two groove flanks 60 and 62. The longitudinal groove has, as shown in the depicted embodiment, for example, a swallow-tail profile, so that it becomes wider in the directions of its groove base 58. In a end segment 64 (to the left as seen in FIG. 9) of the longitudinal groove 52 its groove flanks 60 and 62 extend parallel to one another, in contrast to which, in an end segment 66 (to the right as seen in FIG. 9) of the longitudinal groove 52, located between the end segment 64 and the segment 54, they gradually approach one another or converge with one another, as may be seen in FIG. 9.

The peripheral wall 26 is equipped with a protrusion 68 extending in the longitudinal direction of the plug, which protrusion has a profile complementary to that of the longitudinal groove 52 and which interlocks with the latter, whereby, however, the flanks 70 and 72 of the protrusion 68 extend parallel to one another over the entire length of the latter and thus over the entire length of the longitudinal groove 52 of the sliding element 50. The extent and distance to one another of the two flanks 70 and 72 are of such a nature that they come into contact with the groove flanks 60 and 62 in the end segment 66 and pressure is exercised by the latter mentioned groove flanks onto the flanks 70 and 72 when the sliding element 50 has been completely shifted onto the peripheral wall 26. This pressure results in a radial compression and deformation of the protrusion 68 and thus of the peripheral wall 26, whereby the extent of this compression and deformation will adjust itself to the degree to which the sliding element 50 has been shifted onto the protrusion (to the right as seen in FIGS. 4 and 5).

In the embodiment in accordance with FIGS. 5 through 9 the borehole 24 is formed essentially along the longitudinal center line of the protrusion 68 in such a manner that the borehole 24 is not completely enveloped by the peripheral wall 26, but rather is open at the head of the protrusion 68, so that the plug 14 inserted into the borehole 24 will in part protrude radially from the head of the protrusion 68, as may be seen in FIG. 6 especially. Accordingly, the groove base 58 is equipped with a furrow-shaped recess, which accommodates the radially protruding portion of the plug, as also may be seen in FIG. 6. The segment of the sliding element 50 equipped with the longitudinal groove 52 is arranged on the inner lateral surface of the peripheral wall 26, i.e. the side facing the head of the spectacle wearer, so that the joints extending in longitudinal direction between the sliding element 50 and the peripheral wall 26 extend on the upper side and the lower side of the first segment 18, as the joints in the top view according to FIG. 5 show.

The fitting of the temple in accordance with the second embodiment is accomplished basically in a manner similar to that described in the above for the temple in accordance with the preferred embodiment, whereby the only difference consists of the fact that the increase in static friction or clamping between the peripheral wall 26 and the plug 14 in the second embodiment is brought about by an increasing axial shifting of the sliding element 50 instead of by screwing on the collar 36 of the preferred embodiment.

The FIGS. 10 through 16 show a third embodiment of the present invention, in which a variant of the second embodiment is involved. The identical reference numerals are in turn used for identical or analagous elements as are used in the first two embodiments. Identical or analagous elements are not described anew in the following. Rather, only the differences are described of the third embodiment to the second embodiment. Deviating from the second embodiment, provision is made in the third embodiment for the sliding element 50 to be situated on the upper side of the peripheral wall 26. In addition, in the third embodiment provision is made for the peripheral wall 26 to envelope the borehole 24 completely and for the protrusion 68 to be equipped with a longitudinal slot 76, which extends radially from the borehole 24 to the head of the protrusion 68. As may be seen in FIG. 12, this does not involve a swallow-tail profile in the profile of the longitudinal groove, but rather a hammer profile.

In order to assure the sliding element 50 a position corresponding to the maximum compression of the peripheral wall 26, the third embodiment manifests detent elements in the form of a protusion extending in the circumferential direction on the sliding element 50 (see FIG. 15) and a furrow 80 on the outer side of the peripheral wall 26.

The adaptation of the temple in accordance with the third embodiment is accomplished basically in the same manner as the adaptation of the temple in accordance with the second embodiment. The first segment 18 of the temple end piece 4 and the peripheral wall 26 will be made in the second and third embodiments, as they also do in the preferred embodiment, preferably of a plastic, especially of a polyetherimide. A metal can be considered as a material for the peripheral wall 26 in all three embodiments only if the peripheral wall only if the peripheral wall can be compressed and deformed sufficiently by means of the clamping element constituted by the collar or sliding element in order to achieve the requisite clamping. As a material for the sliding element 50 of the second and third embodiments, in addition to plastics, metallic materials can also be considered, which, because of their high tensile strength and the low deformability they allow, are especially well suited.

In the above-described embodiments the surfaces of the borehole 24 and the plug 14 are smooth cylindrical surfaces. However, in order to increase static friction, provision can be made for the two of them to have a fine-fibrous property, so as in this manner to increase the adhesion between the two surfaces and thus the clamping effect in the final state of fixation.

In addition, in a departure from the above-described embodiments, provision can be made for the plug 14 to have protrusions protruding radially in its longitudinal direction, so that it will have, for example, the profile in the form of a regular polygon. In this design the static friction in the final state of fixation will then be enhanced between the plug 14 and the peripheral wall 26 through a form-locking between the two latter-mentioned elements. For this purpose the planned dimensions will preferably be carried out in such a manner that the form-locking will not yet be produced in the pre-fixed state, but rather will occur only at the time of transition into the final state of fixation.

To the extent that the present invention has been explained citing the examples of the embodiments and their variants, the connection produced between the temple end piece 4 and the shaft 2 will be dissolvable. If the dissolvability of this connection can be done without, provision can be made for the surface of the borehole 24 or of the plug 14 to be coated with an adhesive that is liberated upon the application of pressure, and which it not activated until the clamping element in the form of the collar or the sliding element assumes the position corresponding to the maximum strength of the peripheral wall 26. An adhesive connection will then result which will be distinguished by especially great strength and stressing capacity.

A temple for a spectacle frame has a plug connection between the shaft of the temple and temple end piece first made separately from the shaft of the temple. The plug connection is comprised of a borehole in one of the two elements and a plug on the other of the two elements, which plug is inserted into the borehole, as well as a fixing mechanism for ensuring the relative position between the temple end piece and the shaft. The fixing mechanism has a clamping element, which can assume various axial positions with respect to the peripheral wall surrounding the borehole and which, depending on its axial position, more or less sharply compresses the peripheral wall radially and through this means clamps the plug firmly in the borehole. This design of the fixing mechanism facilitates an exact setting of the length of the temple and of the inner inclination of the temple in adapting it to the geometry of the head of the individual spectacle wearer.

I claim:

1. Temple for a spectacle frame comprising: a longitudinally extending, essentially straight shaft; means at a first end of said shaft for connecting said shaft to the remainder of the spectacle frame; a temple end piece having a first segment that extends in the longitudinal direction of the shaft, a second segment connected to the first segment and extending downwardly therefrom at an angle of less than 180°, said first segment of the temple end piece and the second end of the shaft being connected to one another by means of a plug connection comprising a plug and a borehole having engageable surfaces; and means for clamping the first segment and the second end of the shaft in their relative position to one another, at least one of the engageable surfaces of the plug connection being cylindrical in form over its entire length of engagement with the other surface, said clamping means comprising a sliding clamping element having a groove extending in the longitudinal direction of the plug, said groove having a bottom and two spaced flanks defining a cross section which becomes wider in the direction toward said bottom, said plug having a longitudinally extending exterior protrusion with two spaced flanks such that said protrusion has a cross section complimentary to that of said groove, said two flanks of said groove converging toward one another in the direction toward a free end of said sliding clamping element whereby as said clamping element is slid onto said protrusion, said clamping element engages and radially deforms an exterior wall of said plug connection surrounding the borehole in an amount depending on the axial position of said clamping element on said exterior wall.

2. Temple according to claim 1, characterized by the fact that the plug has radial protrusions extending in its longitudinal direction and that the surface of the borehole is cylindrical in form over the entire length of the engagement between said borehole and said plug prior to the deformation of said exterior wall.

3. Temple according to claim 2, characterized by the fact that the plug has a profile in the shape of a regular polygon.

4. Temple according to claim 1, characterized by the fact that the surfaces of said borehole and plug are cylindrical in shape over the entire length of the engagement between borehole and plug.

5. Temple according to any one of the claims 1 through 4, characterized by the fact that at least one of the interengaging surfaces of the borehole and the plug is roughened.

6. Temple according to any one of the claims 1 through 4, characterized by the fact that the interengaging surfaces of the borehole and the plug each have a fine-fibrous property.

7. Temple according to any one of the claims 1 through 4, characterized by the fact that at least one of the interengaging surfaces of the borehole and the plug is coated with an adhesive that can be liberated upon the application of pressure.

8. Temple according to any one of the claims 1 through 4, characterized by the fact that said borehole has a peripheral wall made of a plastic.

9. Temple according to any one of the claims 1 through 4, characterized by the fact that the borehole is formed in the first segment of the temple end piece and that the plug is formed by the second end of the shaft.

10. Temple according to claim 1, characterized by the fact that the flanks of the protrusion comprise edges which extend parallel to one another over the entire length of the protrusion.

11. Temple according to claim 10, characterized by the fact that said protrusion has a longitudinally extending slot, said slot extending radially outwardly from the borehole through said protrusion.

12. Temple according to claim 10, characterized by the fact that the borehole extends longitudinally along the center line of the protrusion and that the plug in part protrudes radially from the protrusion.

13. Temple according to claim 10, characterized by the fact that the sliding element has a tapered collar at the end thereof opposite said free end.

14. Temple according to claim 1, characterized by the fact that the sliding element is situated on the upper side of said plug connection.

15. Temple according to claim 1, characterized by the fact that the sliding element is situated on a lateral side of said plug connection.

16. Temple according to claim 1, further comprising detent elements on the sliding element and said protrusion, said detent elements engaging one another when the sliding element assumes its permanent intended axial position.

* * * * *

UNITED STATES PATENT AND TRADEMARK OFFICE
CERTIFICATE OF CORRECTION

PATENT NO. : 4,787,728

DATED : Nov. 29, 1988

INVENTOR(S) : Wilhelm Anger

It is certified that error appears in the above-identified patent and that said Letters Patent is hereby corrected as shown below:

On the Title Page, Item [76], delete "Pas-Cjira" and insert therefor --Pas-Chura--.

Signed and Sealed this

Seventh Day of March, 1989

Attest:

DONALD J. QUIGG

Attesting Officer

Commissioner of Patents and Trademarks